United States Patent
Huang et al.

(10) Patent No.: US 11,205,966 B2
(45) Date of Patent: *Dec. 21, 2021

(54) AC-DC POWER CONVERTER

(71) Applicant: Silergy Semiconductor Technology (Hangzhou) LTD, Hangzhou (CN)

(72) Inventors: Qiukai Huang, Hangzhou (CN); Jian Deng, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 31 days.

This patent is subject to a terminal disclaimer.

(21) Appl. No.: 16/594,244

(22) Filed: Oct. 7, 2019

(65) Prior Publication Data

US 2020/0127574 A1 Apr. 23, 2020

(30) Foreign Application Priority Data

Oct. 18, 2018 (CN) .......................... 201811214544.2

(51) Int. Cl.
*H02M 3/335* (2006.01)
*H05B 45/37* (2020.01)
*H02M 1/14* (2006.01)

(52) U.S. Cl.
CPC ......... *H02M 3/33523* (2013.01); *H02M 1/14* (2013.01); *H05B 45/37* (2020.01)

(58) Field of Classification Search
CPC ...... H02M 3/33523; H02M 1/14; H05B 45/37
See application file for complete search history.

(56) References Cited

U.S. PATENT DOCUMENTS

| | | |
|---|---|---|
| 6,005,780 A | 12/1999 | Hua |
| 6,580,258 B2 | 6/2003 | Wilcox et al. |
| 9,325,254 B2 | 4/2016 | Deng et al. |
| 9,331,588 B2 | 5/2016 | Chen |
| 9,488,680 B2 | 11/2016 | Xu |
| 10,951,119 B2* | 3/2021 | Beneux .................. H02M 3/156 |
| 2014/0078789 A1 | 3/2014 | Li et al. |
| 2014/0239934 A1 | 8/2014 | Zhang |
| 2015/0069924 A1* | 3/2015 | Deng .................. H05B 45/3725 |
| | | 315/200 R |
| 2015/0160270 A1 | 6/2015 | Shi et al. |
| 2015/0280578 A1 | 10/2015 | Huang et al. |
| 2020/0127553 A1* | 4/2020 | Huang .................. H02M 7/217 |
| 2020/0328671 A1* | 10/2020 | Li ....................... H02M 1/4225 |

FOREIGN PATENT DOCUMENTS

| | | |
|---|---|---|
| CN | 101102077 A | 1/2008 |
| CN | 203617902 U | 5/2014 |
| CN | 203617902 U * | 5/2014 |

* cited by examiner

*Primary Examiner* — Kyle J Moody
*Assistant Examiner* — Lakaisha Jackson (57) ABSTRACT

An AC-DC power converter can include: a front-stage power circuit; a rear-stage power circuit configured to share one power switch as a main power switch with the front-stage power circuit, where the rear-stage power circuit is coupled to a load, and a first magnetic component of the front-stage power circuit and a second magnetic component of the rear-stage power circuit are not in one conductive loop from a positive terminal of a DC input voltage to a negative terminal of the DC input voltage; and an energy storage capacitor coupled to the front-stage power circuit and the rear-stage power circuit, where energy is transferred to the energy storage capacitor and the load when the first magnetic component is discharged.

20 Claims, 7 Drawing Sheets

FIG. 7

AC-DC POWER CONVERTER

RELATED APPLICATIONS

This application claims the benefit of Chinese Patent Application No. 201811214544.2, filed on Oct. 18, 2018, which is incorporated herein by reference in its entirety.

FIELD OF THE INVENTION

The present invention generally relates to the field of power electronics, and more particularly to AC-DC power converters.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

An AC-DC power converter can convert AC voltage into a constant DC signal (e.g., DC voltage or DC current). AC-DC power converters are widely used to drive high-power loads (e.g., motors, light-emitting diode [LED] lamps, etc.). An AC-DC power converter usually includes a rectifier bridge that converts the external AC voltage into a sinusoidal half-wave DC input voltage to be supplied to a subsequent conversion circuit. In order to reduce harmonic pollution to the AC power grid, the AC-DC power converter may utilize a power factor correction (PFC) circuit to realize a power factor correction function and to obtain a higher power factor (PF). The AC-DC power converter can apply a two-stage conversion circuit or a single-stage conversion circuit, in order to realize the power factor correction function and 2 obtain a constant output signal. However, the two-stage conversion circuit (e.g., a PFC circuit and a DC/DC circuit) scheme has more devices and more complex control, and the voltage across the energy storage capacitor in the single-stage conversion circuit scheme can be relatively high, causing higher power device costs.

In one embodiment, an AC-DC power converter can include: (i) a front-stage power circuit; (ii) a rear-stage power circuit configured to share one power switch as a main power switch with the front-stage power circuit, where the rear-stage power circuit is coupled to a load, and a first magnetic component of the front-stage power circuit and a second magnetic component of the rear-stage power circuit are not in one conductive loop from a positive terminal of a DC input voltage to a negative terminal of the DC input voltage; and (iii) an energy storage capacitor coupled to the front-stage power circuit and the rear-stage power circuit, where energy is transferred to the energy storage capacitor and the load when the first magnetic component is discharged.

Figure 1:
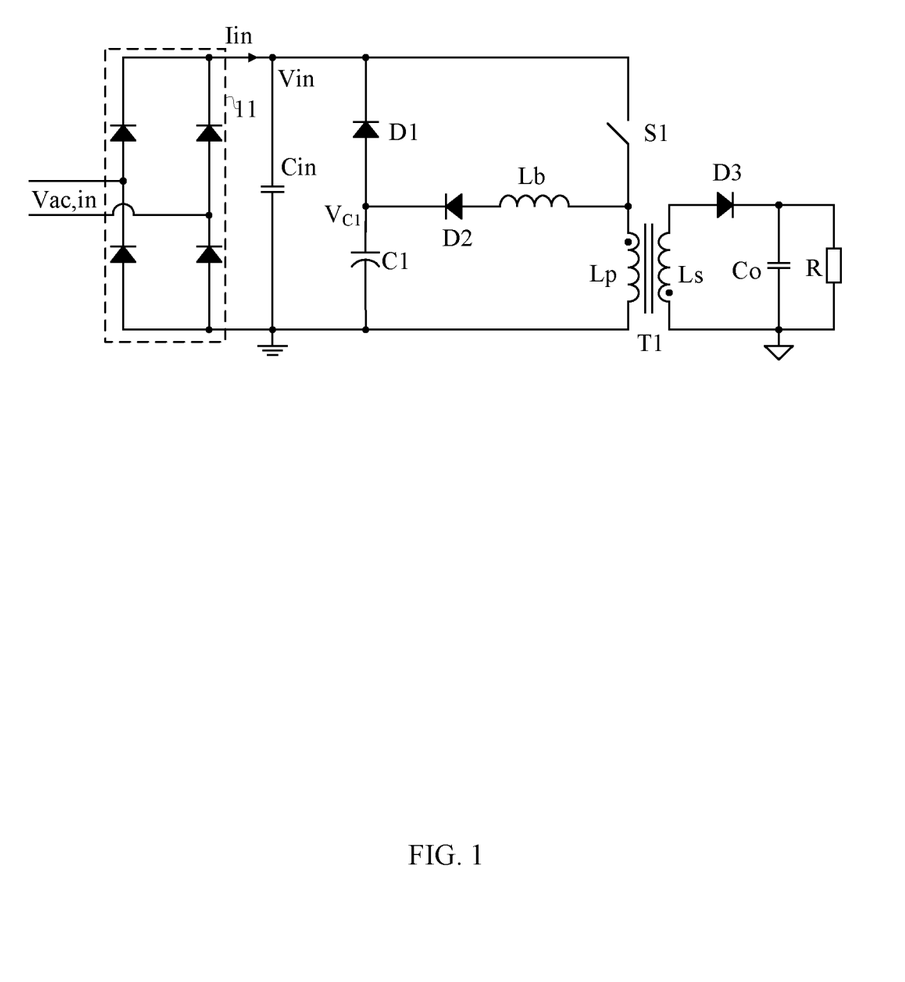
FIG. 1 is a schematic block diagram of a first example AC-DC power converter, in accordance with embodiments of the present invention.

Referring now to FIG. 1, shown is a schematic block diagram of a first example AC-DC power converter, in accordance with embodiments of the present invention. External AC voltage Vac,in can be rectified and filtered by rectifier circuit 11 and filtering capacitor Cin to obtain a sinusoidal half-wave DC input voltage Vin. The AC-DC power converter can include power switch S1, energy storage capacitor C1, a front-stage power circuit, and a rear-stage power circuit. Power switch S1 can be a common main power switch of the front-stage power circuit and the rear-stage power circuit, and load R can be coupled with the rear-stage power circuit. Since the front-stage and the rear-stage power circuits share one power switch, the AC-DC power converter can be referred to as a single-stage power converter. Energy storage capacitor C1 can be coupled with power switch S1 through an energy storage component, and the energy storage component can be an inductor or a transformer. Moreover, the AC-DC power converter can charge energy storage capacitor C1 through the front-stage power circuit. When DC input voltage Vin is less than voltage $V_{C1}$ on energy storage capacitor C1, the power supplied to load R may be at least partially provided by energy storage capacitor C1.

In each switching period, at least a portion of the energy provided by the DC input voltage of the AC-DC power converter can be directly transferred to load R through one power conversion of the rear-stage power circuit. The front-stage power circuit can charge energy storage capacitor C1 in an energy storage state, a freewheeling state (e.g., magnetic component discharges energy), or both. When DC input voltage Vin is less than voltage $V_{C1}$ on energy storage capacitor C1, the rear-stage power circuit can supply power to load R may be at least partially provided by energy storage capacitor C1.

For example, when DC input voltage Vin is greater than voltage $V_{C1}$ on energy storage capacitor C1, if power switch S1 is turned on, the front-stage power circuit and the rear-stage power circuit can be in an operation state at the same time. Also, if power switch S1 is turned off, the front-stage power circuit and the rear-stage power circuit may be in a freewheeling state at the same time. In the freewheeling state, the rear-stage power circuit can directly transmit part of the energy provided by the DC input voltage to load R through one power conversion, and the AC-DC power converter may transmit energy to energy storage capacitor C1 and load R through a first magnetic component in the front-stage power circuit.

When DC input voltage Vin is less than voltage $V_{C1}$ on energy storage capacitor C1, if power switch S1 is turned on, only the rear-stage power circuit may be in the operation state at this time, and the rear-stage power circuit can obtain energy through energy storage capacitor C1. Also, if power switch S1 is turned off, the rear-stage power circuit may be in the freewheeling state. Alternatively, when DC input voltage Vin is less than voltage $V_{C1}$ on energy storage capacitor C1, if power switch S1 is turned on, both the front-stage power circuit and the rear-stage power circuit can be in the operation state, and the rear-stage power circuit may obtain energy through energy storage capacitor C1 or through both DC input voltage Vin and energy storage capacitor C1 at the same time. Also, if power switch S1 is turned off, both the front-stage power circuit and the rear-stage power circuit can be in the freewheeling state at this time, and the first magnetic component in the front-stage power circuit can transfer energy to energy storage capacitor C1 and load R.

In FIG. 1, the example AC-DC power converter can include diode D1. An anode of diode D1 can connect to a positive electrode of energy storage capacitor C1, a cathode of diode D1 can connect to a first output terminal of rectifier circuit 11, and a second output terminal of rectifier circuit 11 may be grounded. Power switch S1 can connect to the cathode of diode D1, and here, the "first" magnetic component may refer to inductor Lb, and a "second" magnetic component may refer to transformer T1. Further, the front-stage power circuit is a circuit topology capable of realizing a step-down function (e.g., a buck circuit, a forward circuit, etc.). For example, the front-stage power circuit can include inductor Lb having one terminal connected to the first terminal of power switch S1 and the other terminal connected to an anode of diode D2, while a cathode of diode D2 can connect to the positive electrode of energy storage capacitor C1. The second terminal of power switch S1 can connect to the first output terminal of rectifier circuit 11 (e.g., the cathode of diode D1).

The rear-stage power circuit can include transformer T1, diode D3, output capacitor Co, and load R coupled to the output terminal of the rear-stage power circuit. For example, a first terminal of primary winding Lp of transformer T1 can connect to a common node of power switch S1 and inductor Lb, and a second terminal of primary winding Lp can connect to ground. An anode of diode D3 can connect to secondary winding Ls of transformer T1, and a cathode of diode D3 can connect to output capacitor Co. In this example, power switch S1, transformer T1, and diode D3 may form a flyback circuit.

Figure 2:
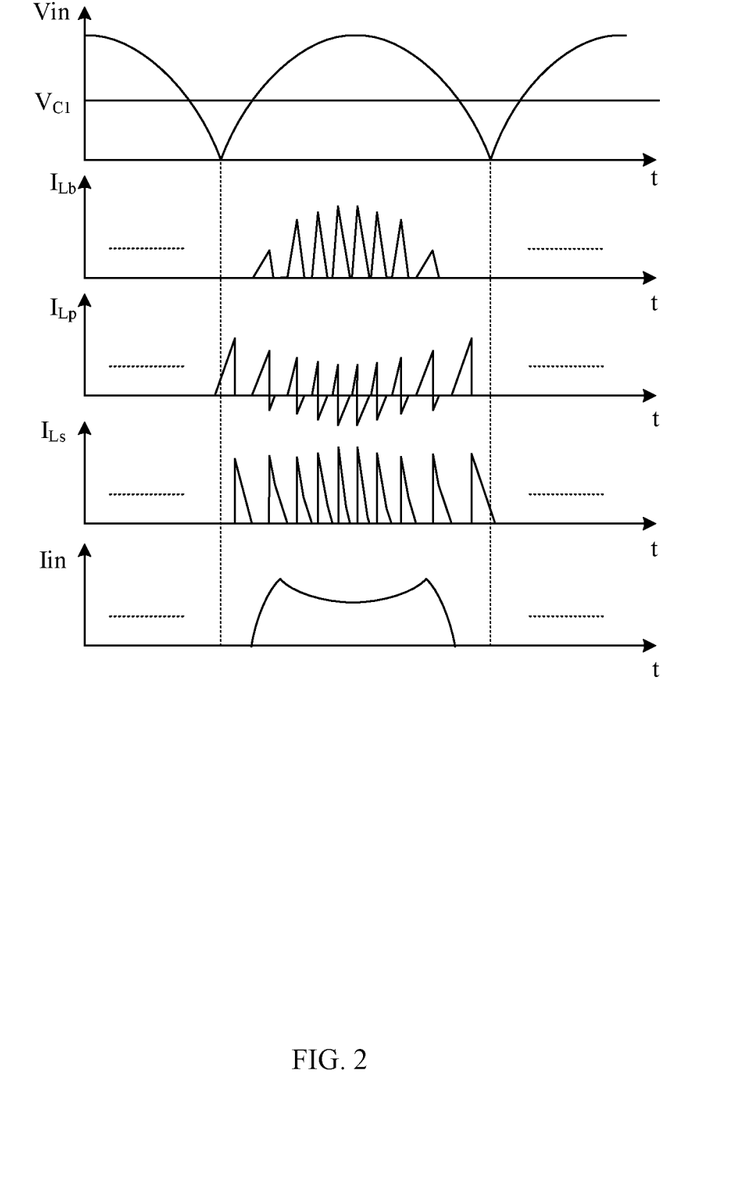
FIG. 2 is a waveform diagram of example operation of the first example AC-DC power converter, in accordance with embodiments of the present invention.

Referring now to FIG. 2, shown is a waveform diagram of example operation of the first example AC-DC power converter in accordance with embodiments of the present invention. When DC input voltage Vin is greater than voltage $V_{C1}$ on energy storage capacitor C1, a first path may be formed by DC input voltage Vin, power switch S1, inductor Lb, and diode D2, thereby forming a buck circuit. Also, a second path may be formed by DC input voltage Vin, power switch S1, and transformer T1, thereby forming a flyback circuit.

When power switch S1 is turned on, DC input voltage Vin can provide energy to first inductor Lb and may charge energy storage capacitor C1 through the first path. Energy storage capacitor C1 can be in an energy storage state. At the same time, DC input voltage Vin may also provide energy for primary winding Lp of transformer T1 through the second path. Here, since the front-stage power circuit is a buck topology, voltage $V_{C1}$ on energy storage capacitor C1 may not exceed the peak value of DC input voltage Vin, such that voltage $V_{C1}$ on energy storage capacitor C1 can be controlled in a lower range, and the cost of the power device and the energy storage capacitor can be reduced. During this period, current kb flowing through inductor Lb and current $I_{Lp}$ flowing through primary winding Lp of transformer T1 can rise when power switch S1 is turned on.

When power switch S1 is turned off, inductor Lb in the first path can demagnetize through energy storage capacitor C1 and transformer T1 to release the energy to energy storage capacitor C1 and load R. That is, energy storage capacitor C1 can remain in the energy storage state during this period. Correspondingly, current $I_{Lp}$ flowing through primary winding Lp of transformer T1 can decrease in the reverse direction. At the same time, the energy stored in primary winding Lp of transformer T1 may also be released to load R through diode D3. It should be noted that the energy stored in primary winding Lp of transformer T1 during the conduction period of power switch S1 can be transferred to load R only after one power conversion by the flyback circuit. As compared with the two-stage circuit, the energy conversion efficiency can be improved because part of the energy provided by the DC input voltage is transferred only after one power conversion. In this period, current kb flowing through inductor Lb and current $I_{Ls}$ flowing through secondary winding Ls of transformer T1 can decrease.

When DC input voltage Vin is less than voltage $V_{C1}$ on energy storage capacitor C1, a third path may be formed by energy storage capacitor C1, diode D1, power switch S1, and transformer T1. When power switch S1 is turned on, primary winding Lp of transformer T1 can store energy provided by energy storage capacitor C1 through the third path. At this time, energy storage capacitor C1 can be in a discharging state. During this period, input current Iin may be zero, and the buck circuit of the front-stage circuit may not operate. When power switch S1 is turned off, the energy stored in primary winding Lp of transformer T1 can be released to load R. Since energy storage capacitor C1 supplies energy to load R when DC input voltage Vin is low, the output voltage or current of the AC-DC power converter may not be too low in this period, such that the output ripple can be reduced. Moreover, when DC input voltage Vin is low, input current Iin is zero, and the peak current of power switch S1 can increase with the DC input voltage Vin, such that the average input current approximately may follow the input voltage, which is also conducive to the optimization of the PF of the system.

Those skilled in the art will recognize that the control circuit can control the on-time or peak current of power switch S1 according to the feedback signal of the output current or the output voltage, in order to achieve low output ripple voltage or output ripple current, both in discontinuous conduction mode (DCM) mode and in continuous conduction mode (CCM) mode. Thus, the AC-DC power converter of certain embodiments can realize power transmission by only one power switch and a control circuit. In addition, when DC input voltage Vin is greater than voltage $V_{C1}$ on energy storage capacitor C1, energy storage capacitor C1 can be charged by the front-stage power circuit, and at least part of the energy provided by the DC input voltage may be directly transferred to load R after one power conversion of the rear-stage power circuit. When DC input voltage Vin is less than voltage $V_{C1}$ on energy storage capacitor C1, the rear-stage power circuit can supply power to load R by acquiring the energy of energy storage capacitor C1, such that the AC-DC power converter has the advantages of low output ripple, high energy conversion efficiency, low device stress and the like, and the PF of the AC-DC power converter can be optimized.

Figure 3:
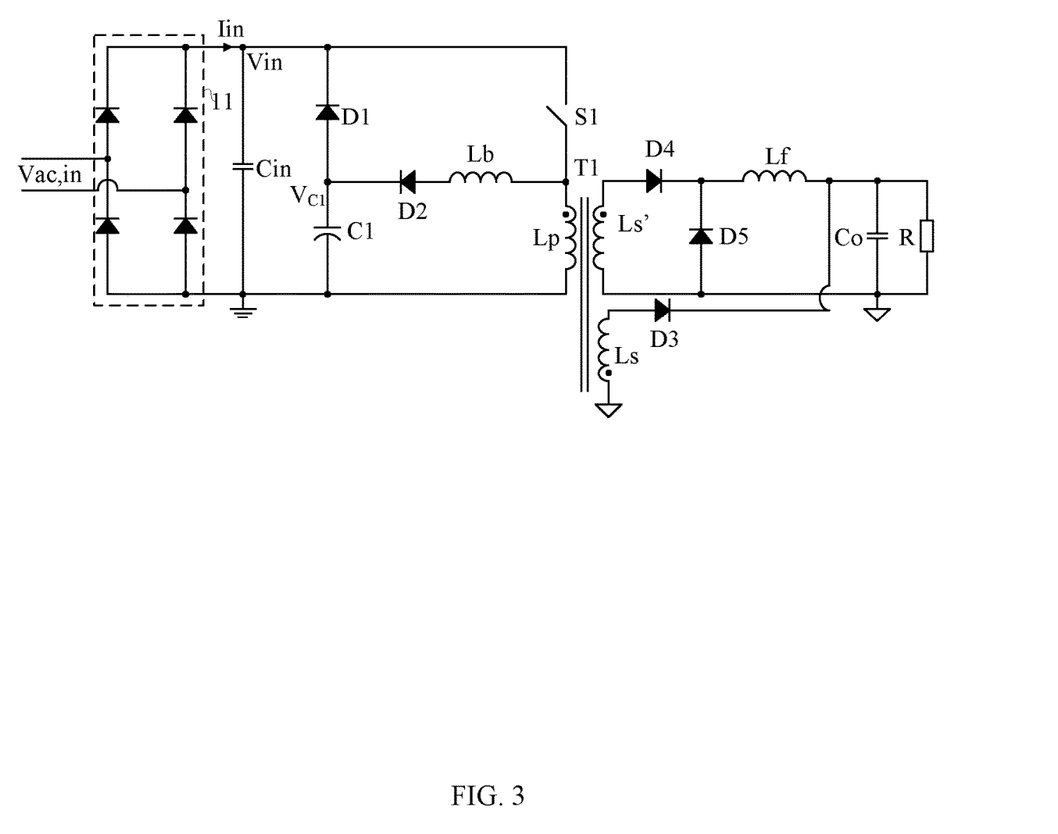
FIG. 3 is a schematic block diagram of a second example AC-DC power converter, in accordance with embodiments of the present invention.

Referring now to FIG. 3, shown is a schematic block diagram of a second example AC-DC power converter in accordance with embodiments of the present invention. In this particular example, the rear-stage power circuit can include transformer T1, diode D4, diode D5, inductor Lf, and also output capacitor Co and load R coupled to the output terminal of the rear-stage power circuit. Transformer T1 can also include additional secondary winding Ls', where second secondary winding Ls' and primary winding Lp form a forward transformer. For example, a first terminal of primary winding Lp can connect to a common node of power switch S1 and inductor Lb, and a second terminal of primary winding Lp can connect to ground.

An anode of diode D4 can connect to one terminal of secondary winding Ls' of transformer T1, a cathode of diode D4 can connect to a cathode of diode D5. Also, the other terminal of secondary winding Ls' can connect to an anode of diode D5, and the anode of diode D5 can connect to a secondary ground (e.g., with a different ground potential than that of the front-stage power circuit). Also, one terminal of inductor Lf can connect to the common node of diodes D4 and D5, and the other terminal of inductor Lf can connect to output capacitor Co. In this example, power switch S1, transformer T1, diode D4, diode D5, and inductor Lf may form a forward circuit. Also, power switch S1, transformer T1, and diode D3 may form a flyback circuit. Similarly, the "first" magnetic component may refer to inductor Lb and the "second" magnetic component may refer to transformer T1.

When DC input voltage Vin is greater than voltage $V_{C1}$ on energy storage capacitor C1, a first path may be formed by DC input voltage Vin, power switch S1, inductor Lb, and diode D2, thereby forming a buck circuit. Also, a second path may be formed by DC input voltage Vin, power switch S1, transformer T1, diode D4, diode D5, and inductor Lf, thereby forming the forward circuit. Also, a third path may be formed by DC input voltage Vin, power switch S1, transformer T1, and diode D3, thereby forming the flyback circuit. When power switch S1 is turned on, DC input voltage Vin can provide energy for inductor Lb and charge energy storage capacitor C1 through the first path, and energy storage capacitor C1 is in an energy storage state. At the same time, DC input voltage Vin may also provide energy for primary winding Lp of transformer T1 through the second path, such that a voltage can be generated on secondary winding Ls' for supplying power to load R. When power switch S1 is turned off, inductor Lb in the first path may demagnetize through energy storage capacitor C1 and transformer T1 to charge energy storage capacitor C1. That is, energy storage capacitor C1 may remain in the energy storage state. At the same time, the energy stored in inductor Lf can also be released to load R, and the energy stored in primary winding Lp of transformer T1 may also be transferred to load R through secondary winding Ls.

When DC input voltage Vin is less than voltage $V_{C1}$ on energy storage capacitor C1, a fourth path may be formed by energy storage capacitor C1, diode D1, power switch S1, transformer T1, diode D4, diode D5, and inductor Lf. Also, a fifth path may be formed by energy storage capacitor C1, power switch S1, transformer T1, and diode D3. When power switch S1 is turned on, energy storage capacitor C1 can discharge to store the energy to primary winding Lp of transformer T1 through the fourth path, such that a voltage may be generated on secondary winding Ls' for supplying power to load R. At this time, energy storage capacitor C1 can be in a discharging state. In this period, input current Tin in this period may be zero, and the buck circuit of the front-stage power circuit may not be operable. When power switch S1 is turned off, the energy stored in inductor Lf can be released to load R, and the energy stored in primary winding Lp of transformer T1 may also be transferred to load R through secondary winding Ls.

Figure 4:
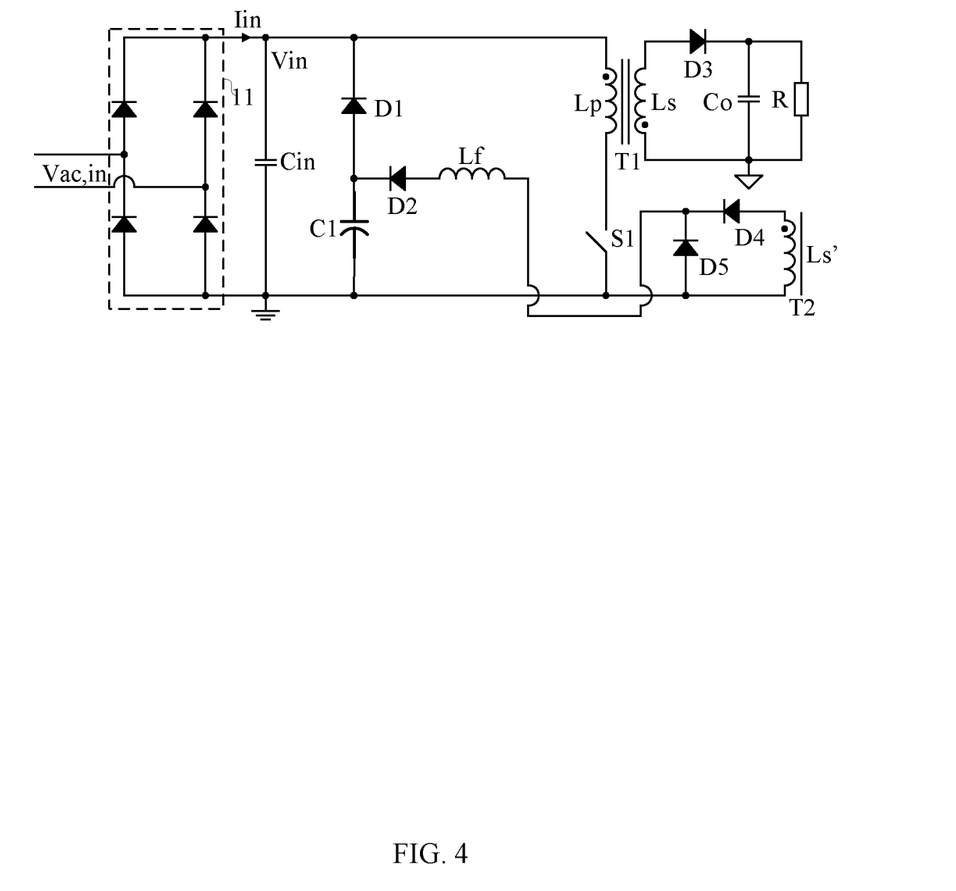
FIG. 4 is a schematic block diagram of a third example AC-DC power converter, in accordance with embodiments of the present invention.

Referring now to FIG. 4, shown is a schematic block diagram of a third example AC-DC power converter in accordance with embodiments of the present invention. In this example, the front-stage power circuit can include transformer T2, diode D4, diode D5, inductor Lf, and diode D2. For example, the first terminal of primary winding Lp of transformer T2 can connect to the first output terminal of rectifier circuit 11, the second terminal of primary winding Lp can connect to a first terminal of power switch S1, and a second terminal of power switch S1 may be grounded. In certain embodiments, since the rear-stage power circuit is a flyback circuit having transformers T1 and T2, primary winding Lp of transformer T1 can be shared. That is, primary winding Lp and secondary winding Ls may form transformer T1, and primary winding Lp and secondary winding Ls' may form transformer T2. Thus, transformers T1 and T2 may share a magnetic core at the same time.

An anode of diode D4 can connect to one terminal of winding Ls' of transformer T2, the other terminal of secondary winding Ls' can connect to an anode of diode D5, and the anode of diode D5 can connect to the second ground (e.g., with a different ground potential than that of the front-stage power circuit). One terminal of inductor Lf can connect to a common node of diodes D4 and D5 (e.g., cathodes of diodes D4 and D5), the other terminal of second inductor Lf can connect to an anode of diode D2, and the cathode of diode D2 can connect to a positive electrode of energy storage capacitor C1. In this example, power switch S1, transformer T2, diode D4, diode D5, and inductor Lf may form a forward circuit. Here, the "first" magnetic component may refer to transformer T1 and the "second" magnetic component may refer to transformer T2.

When DC input voltage Vin is greater than voltage $V_{C1}$ on energy storage capacitor C1, a first path may be formed by power switch S1, transformer T2, diode D4, diode D5, inductor Lf, and diode D2, thereby forming a forward circuit. Also, a second path may be formed by power switch S1, transformer T1, and diode D3, thereby forming a flyback circuit. When power switch S1 is turned on, DC input voltage Vin can provide energy for inductor Lf and may charge energy storage capacitor C1 through the first path, and energy storage capacitor C1 can be in an energy storage state. At the same time, DC input voltage Vin may also provide energy for primary winding Lp of transformer T1 through the second path. When power switch S1 is turned off, inductor Lf in the first path can demagnetize through energy storage capacitor C1 to release the energy to charge energy storage capacitor C1; that is, energy storage capacitor C1 can remain in the energy storage state. At the same time, the energy stored in primary winding Lp may also be transferred to load R through secondary winding Ls of transformer T1.

When DC input voltage Vin is less than voltage $V_{C1}$ on energy storage capacitor C1, a third path may be formed by energy storage capacitor C1, diode D1, power switch S1, transformer T1, and diode D3. When power switch S1 is turned on, energy storage capacitor C1 can discharge to store energy in primary winding Lp of transformer T1 through the third path. At this time, energy storage capacitor C1 may be in a discharging state. When power switch S1 is turned off, the energy stored in primary winding Lp can be transferred to load R through secondary winding Ls of transformer T1.

Figure 5:
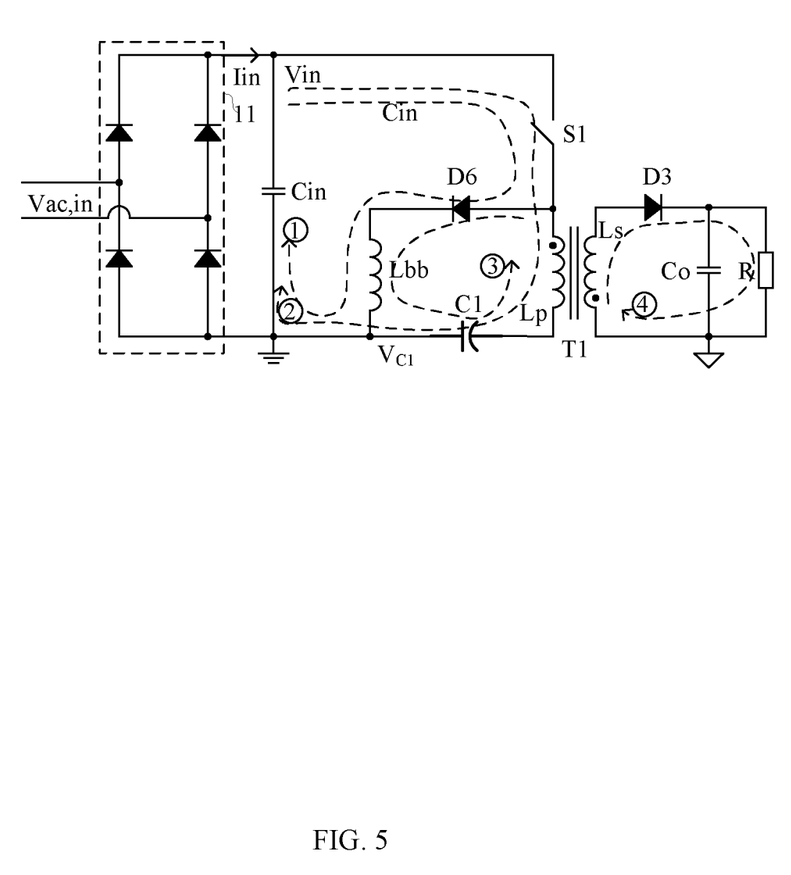
FIG. 5 is a schematic block diagram of a fourth example AC-DC power converter, in accordance with embodiments of the present invention.

Referring now to FIG. 5, shown is a schematic block diagram of a fourth example AC-DC power converter in accordance with embodiments of the present invention. In this example, the "first" magnetic component may refer to inductor Lbb, the "second" magnetic component may refer to transformer T1. In addition, regardless of the level of DC input voltage Vin, when the front-stage power circuit operates, energy storage capacitor C1 can be charged through the freewheeling loop of the front-stage power circuit. Also, when power switch S1 is turned on, energy storage capacitor C1 and DC input voltage Vin may jointly supply power for the rear-stage power circuit.

For example, the front-stage power circuit of the AC-DC power converter can include inductor Lbb, which may form a first loop with power switch S1 and filter capacitor Cin. DC input voltage Vin can provide energy for inductor Lbb through the first loop. For example, filter capacitor Cin can be coupled in parallel with output terminals of rectifier circuit 11, inductor Lbb can connect to a first terminal of power switch S1 through diode D6, and a second terminal of power switch S1 can connect to a first output terminal of rectifier circuit 11. A cathode of diode D6 can connect to one terminal of inductor Lbb, an anode of diode D6 can connect to the first terminal of power switch S1, and the other terminal of inductor Lbb can be ground. Here, the front-stage power circuit of the AC-DC power converter is a buck-boost circuit including power switch S1, diode D6, and inductor Lbb. Further, in the rear-stage power circuit, primary winding Lp of transformer T1, power switch S1, filter capacitor Cin and energy storage capacitor C1 may form a second loop, and DC input voltage Vin may provide energy for transformer T1 through the second loop.

Figure 6:
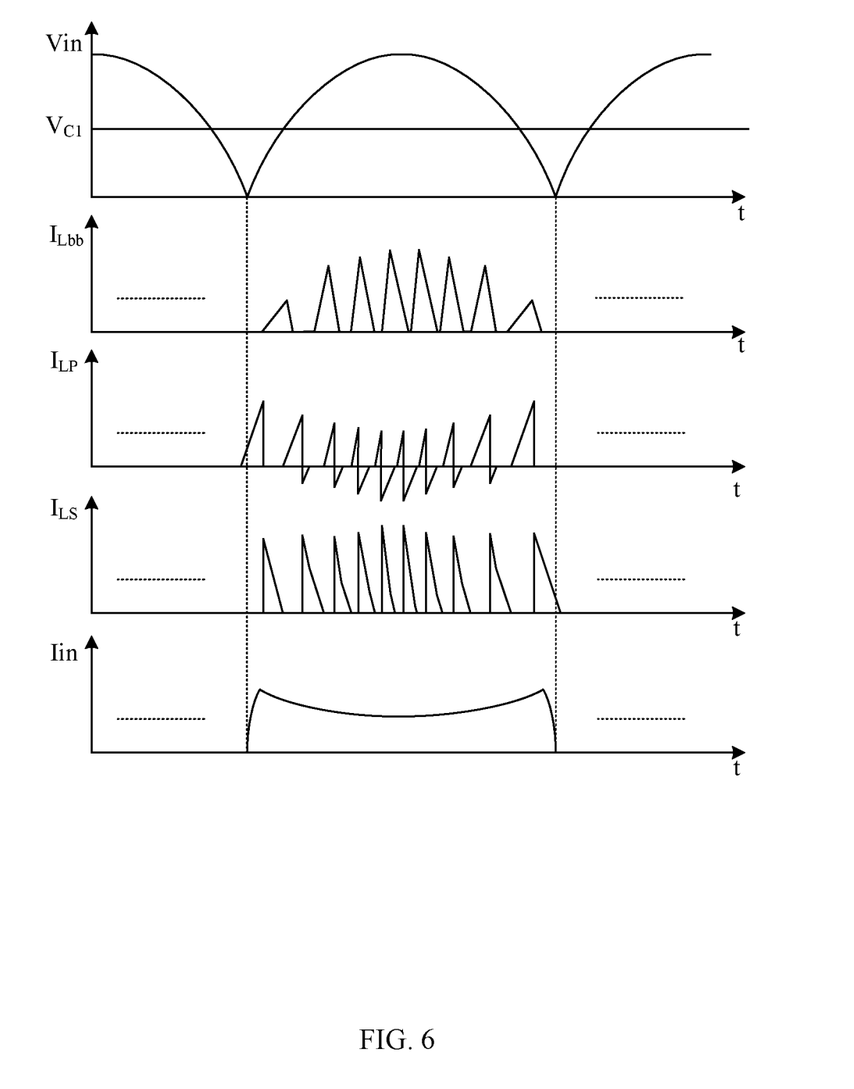
FIG. 6 is a waveform diagram of example operation of the fourth example AC-DC power converter, in accordance with embodiments of the present invention.

Referring now to FIG. 6, shown is a waveform diagram of example operation of the fourth example AC-DC power converter in accordance with embodiments of the present invention. The operation principle of the fourth example AC-DC power converter will be described below with reference to FIGS. 5 and 6. When the power switch S1 is turned on, the first loop formed by inductor Lbb, diode D6, power switch S1, and filter capacitor Cin can conduct, and DC input voltage Vin may provide energy for inductor Lbb through the first loop. At the same time, the second loop formed by primary winding Lp of transformer T1, power switch S1, filter capacitor Cin, and energy storage capacitor C1 may also conduct, and DC input voltage Vin and energy storage capacitor C1 can jointly transmit energy to primary winding Lp of transformer T1 through the second loop. Here, since the front-stage power circuit is a buck-boost topology, voltage $V_{C1}$ on energy storage capacitor C1 can be controlled in a lower range, and the cost of the power device and the energy storage capacitor can be reduced. In this period, current $I_{Lbb}$ flowing through inductor Lbb and current $I_{Lp}$ flowing through primary winding Lp of transformer T1 can rise when power switch S1 is turned on.

When power switch S1 is turned off, inductor Lbb may demagnetize to charge energy storage capacitor C1 through a third loop including inductor Lbb, energy storage capacitor C1, primary winding Lp of transformer T1, and diode D6, and may release energy to load R. That is, energy storage capacitor C1 can be in an energy storage state. At the same time, primary winding Lp of transformer T1 can also release the energy stored in secondary winding Ls to load R through a fourth loop formed by secondary winding Ls, diode D3, and load R. It should be noted that the energy stored in primary winding Lp of transformer T1 during the on-time of power switch S1 can be transferred to load R only after one power conversion by the flyback circuit, which can improve the energy conversion efficiency compared with the two-stage circuit. As shown in FIG. 6, in this period, current $I_{Lbb}$ flowing through inductor Lbb and current $I_{Ls}$ flowing through secondary winding Ls of transformer T1 can decrease, while the current flowing through primary winding Lp of transformer T1 reversely/further decreases.

Figure 7:
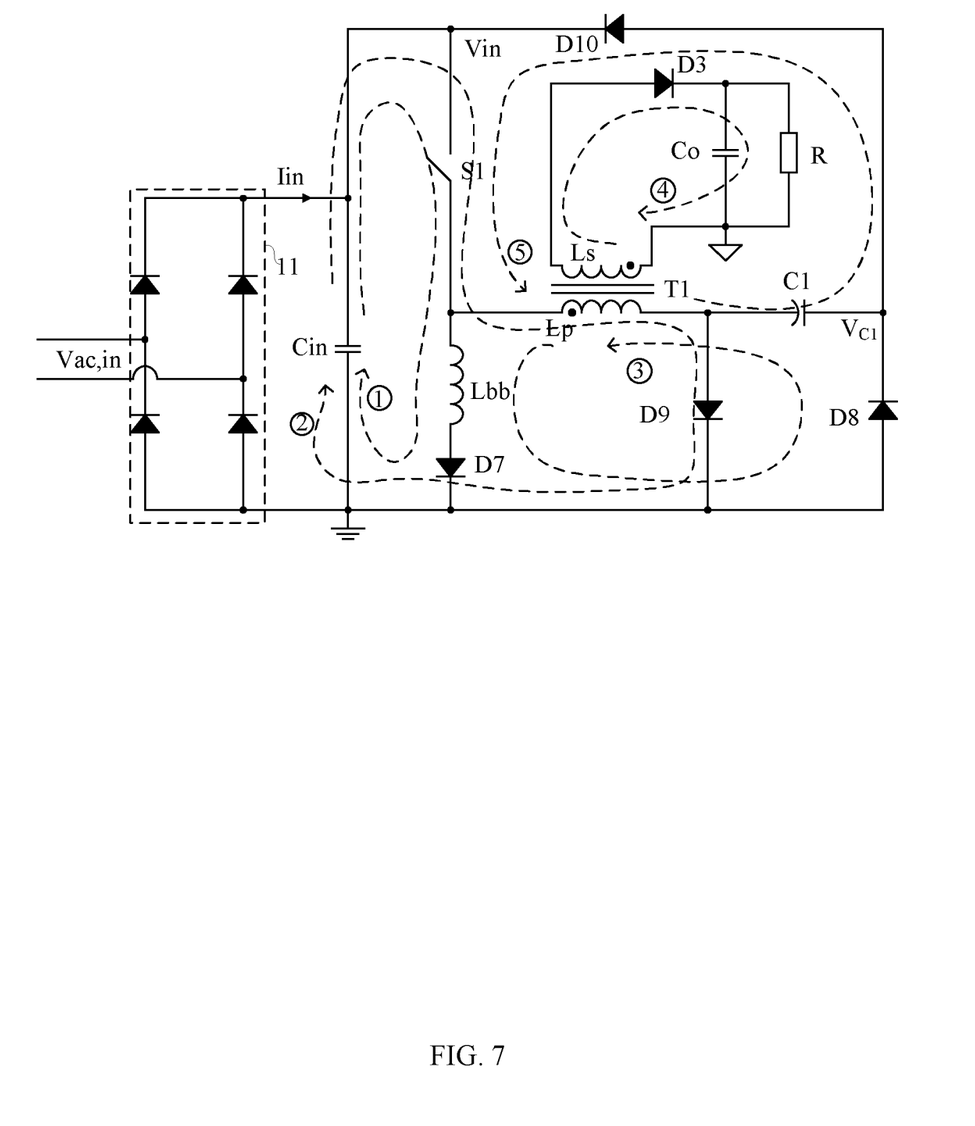
FIG. 7 is a schematic block diagram of a fifth example AC-DC power converter, in accordance with embodiments of the present invention.

Referring now to FIG. 7, shown is a schematic block diagram of a fifth example AC-DC power converter in accordance with embodiments of the present invention. In this particular example, the front-stage power circuit of the AC-DC power converter can include inductor Lbb, which forms a first loop with power switch S1 and filter capacitor Cin. DC input voltage Vin can provide energy to inductor Lbb through the first loop. For example, filter capacitor Cin can be coupled in parallel to output terminals of rectifier circuit 11, one terminal of inductor Lbb can connect to a first terminal of power switch S1, and a second terminal of power switch S1 can connect to a first output terminal of rectifier circuit 11. An anode of diode D7 can connect to the other terminal of third inductor Lbb, and a cathode of diode D7 can connect to ground.

The front-stage power circuit can also include diode D8 to provide a loop for inductor Lbb to discharge. A cathode of diode D8 can connect to a positive electrode of energy storage capacitor C1, and an anode of diode D8 can connect to ground. In this example, the front-stage power circuit is a buck-boost circuit including power switch S1, diode D7, diode D8, and inductor Lbb. The rear-stage power circuit can include diodes D9 and D10 in addition to transformer T1 and diode D3. A cathode of diode D9 can connect to ground, and an anode of diode D9 can connect to one terminal of primary winding Lp of transformer T1. An anode of diode D10 can connect to the positive electrode of energy storage capacitor C1, and a cathode of diode D10 can connect to a second terminal of power switch S1. Here, the "first" magnetic component may refer to inductance Lbb, and the "second" magnetic component may refer to transformer T1.

When DC input voltage Vin is greater than voltage $V_{C1}$ on energy storage capacitor C1, when power switch S1 is turned on, the first loop formed by inductor Lbb, diode D7, power switch S1, and filter capacitor Cin can conduct, and DC input voltage Vin may provide energy for inductor Lbb through the first loop. At the same time, the second loop formed by primary winding Lp of transformer T1, power switch S1, filter capacitor Cin, and diode D9 can also conduct, such that DC input voltage Vin may provide energy for primary winding Lp of transformer T1 through the second loop. Here, since the front-stage power circuit is a buck-boost topology, voltage $V_{C1}$ on energy storage capacitor C1 can be controlled in a lower range, and the cost of the power device and the energy storage capacitor can be reduced.

When the power switch S1 is turned off, inductor Lbb can demagnetize to charge energy storage capacitor C1 through a third loop formed by inductor Lbb, diode D7, diode D8, energy storage capacitor C1, and primary winding Lp of transformer T1, and may release the energy to load R. That is, energy storage capacitor C1 can be in an energy storage state during this period. At the same time, primary winding Lp of transformer T1 may also release the energy stored in secondary winding Ls to load R through a fourth loop formed by secondary winding Ls, diode D3, and load R. It should be noted here that the energy stored in primary winding Lp of transformer T1 during the on-time of power switch S1 may be transferred to load R after only one power conversion by the flyback circuit, which can improve the energy conversion efficiency compared with the two-stage circuit.

When DC input voltage Vin is less than voltage $V_{C1}$ on energy storage capacitor C1, when power switch S1 is turned on, the first loop formed by inductor Lbb, diode D7, power switch S1, and filter capacitor Cin can conduct, such that DC input voltage Vin may provide energy to inductor Lbb through the first loop. At the same time, a fifth loop formed by diode D10, primary winding Lp of transformer T1, power switch S1, and energy storage capacitor C1 can also conduct, such that energy storage capacitor C1 may discharge to provide energy for primary winding Lp of transformer T1, thereby solving the problem of possibly large ripple caused by large change of the output voltage or the output current due to large change of the input voltage. When power switch S1 is turned off, inductor Lbb can demagnetize to charge energy storage capacitor C1 through the third loop, and may release the energy to load R. That is, energy storage capacitor C1 can be in an energy storage state during this period. At the same time, primary winding Lp of transformer T1 may also release the stored energy to load R through the fourth loop.

It should be noted that when DC input voltage Vin is lower, the power of the rear-stage power circuit of the AC-DC power converter may be provided by energy storage capacitor C1, and DC input voltage Vin may only supply power to the front-stage power circuit. Thus, the advantage of this particular example is that when external AC voltage Vac,in is at the valley, there may not be a relatively large input current Iin, thereby improving the PF value of the system.

In particular embodiments, the AC-DC power converter can realize power transmission by one power switch and a control circuit. In addition, when DC input voltage Vin is greater than voltage $V_{C1}$ on energy storage capacitor C1, energy storage capacitor C1 can be charged by the front-stage power circuit, and at least part of the energy provided by the DC input voltage can be directly transferred to load R after one power conversion of the rear-stage power circuit. When DC input voltage Vin is less than voltage $V_{C1}$ on energy storage capacitor C1, the rear-stage power circuit may supply power to load R by acquiring the energy of energy storage capacitor C1, such that the AC-DC power converter has the advantages of low output ripple, high energy conversion efficiency, low device stress and the like, and the PF of the AC-DC power converter can be optimized.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. An AC-DC power converter, comprising:
   a) a front-stage power circuit;
   b) a rear-stage power circuit configured to share one power switch as a main power switch with the front-stage power circuit, wherein the rear-stage power circuit is coupled to a load, and a first magnetic component of the front-stage power circuit and a second magnetic component of the rear-stage power circuit are not in one conductive loop from a positive terminal of a DC input voltage to a negative terminal of the DC input voltage; and
   c) an energy storage capacitor coupled to the front-stage power circuit and the rear-stage power circuit, wherein energy released by the first magnetic component is transferred to the energy storage capacitor and the load when the first magnetic component is discharged.

2. The AC-DC power converter of claim 1, wherein when the DC input voltage is greater than a voltage across the energy storage capacitor, at least part of energy provided by the DC input voltage is directly transferred to the load through one power conversion of the rear-stage power circuit in each switching period.

3. The AC-DC power converter of claim 2, wherein the energy storage capacitor is charged by the front-stage power circuit, and when the DC input voltage is less than the voltage across the energy storage capacitor, the rear-stage power circuit supplies energy to the load at least by the energy discharged by the energy storage capacitor.

4. The AC-DC power converter of claim 2, wherein when the power switch is turned off, the first magnetic component supplies energy to the energy storage capacitor and the load.

5. The AC-DC power converter of claim 1, wherein when the power switch is turned on, the first magnetic component stores energy provided by the DC input voltage, and simultaneously the second magnetic component stores energy provided by at least one of the DC input voltage and the energy storage capacitor.

6. The AC-DC power converter of claim 5, wherein the front-stage power circuit is provided with power by the DC input voltage, and the rear-stage power circuit is provided with power by the DC input voltage and/or the energy storage capacitor.

7. The AC-DC power converter of claim 6, wherein when the DC input voltage is greater than the voltage across the energy storage capacitor, the DC input voltage supplies power to the front-stage power circuit and the rear-stage power circuit.

8. The AC-DC power converter of claim 7, wherein the front-stage power circuit comprises a first loop formed by the first magnetic component, the power switch, and the DC input voltage, wherein the first magnetic component stores energy provided by the DC input voltage through the first loop.

9. The AC-DC power converter of claim 8, wherein the front-stage power circuit further comprises a sixth diode having an anode coupled to the power switch and a cathode coupled to the first magnetic component, in order to provide a freewheeling loop for the first magnetic component.

10. The AC-DC power converter of claim 9, wherein the rear-stage power circuit comprises a ninth diode and a second magnetic component, wherein a cathode of the ninth diode is coupled to a ground and an anode of the ninth diode coupled to the second magnetic component, and the ninth diode is configured to provide a freewheeling loop for the second magnetic component.

11. The AC-DC power converter of claim 8, wherein the rear-stage power circuit comprises:
   a) a first transformer as the second magnetic component, and having a primary winding and a first secondary winding, wherein one terminal of the primary winding coupled to the power switch, the other terminal of the primary winding is coupled to a negative electrode of the energy storage capacitor, and a positive electrode of the energy storage capacitor is coupled to a ground; and
   b) a third diode having an anode coupled to the first secondary winding of the first transformer, and a cathode coupled to the load, wherein the power switch, the first transformer, and the third diode form a flyback circuit.

12. The AC-DC power converter of claim 8, wherein the front-stage power circuit further comprises:
   a) a seventh diode having an anode coupled to the first magnetic component and a cathode coupled to a ground; and
   b) an eighth diode having a cathode coupled to a positive electrode of the energy storage capacitor, and an anode coupled to the ground, wherein the eighth diode is configured to provide a freewheeling loop for the first magnetic component.

13. The AC-DC power converter of claim 12, wherein the rear-stage power circuit further comprises a tenth diode having an anode coupled to a positive electrode of the energy storage capacitor, and a cathode coupled to the power switch, wherein the eighth diode is configured to provide a loop for the second magnetic component to store energy provided by the energy storage capacitor, when the DC input voltage is less than the voltage across the energy storage capacitor.

14. The AC-DC power converter of claim 6, wherein when the power switch is turned on, the DC input voltage and the energy storage capacitor jointly supply power to the rear-stage power circuit.

15. The AC-DC power converter of claim 1, wherein the AC-DC power circuit comprises a first diode, wherein an anode of the first diode is coupled to a positive electrode of the energy storage capacitor, a cathode of the first diode is coupled to a first output terminal of the DC input voltage and the power switch.

16. The AC-DC power converter of claim 15, wherein the front-stage power circuit comprises:
   a) the first magnetic component having a first terminal coupled to a first terminal of the power switch, and the first magnetic component having a second terminal coupled to an anode of a second diode; and
   b) the second diode having a cathode coupled to the positive electrode of the energy storage capacitor.

17. The AC-DC power converter of claim 16, wherein the rear-stage power circuit comprises:
   a) a first transformer as the second magnetic component, and having a primary winding and a first secondary winding, wherein a first terminal of the primary winding is coupled to a common node of the power switch and the first magnetic component; and
   b) a third diode having an anode coupled to the first secondary winding of the first transformer, and a cathode coupled to the load, wherein the power switch, the first transformer, and the third diode form a flyback circuit.

18. The AC-DC power converter of claim 17, wherein the rear-stage power circuit further comprises:
   a) a second secondary winding, configured to share the primary winding of the first transformer;
   b) a fourth diode having an anode coupled to one terminal of the second secondary winding;
   c) a fifth diode having a cathode coupled to a cathode of the fourth diode; and
   d) a second inductor having one terminal coupled to a cathode of the fifth diode, and the other terminal coupled to the load, wherein the power switch, the first transformer, the fourth diode, the fifth diode, and the second inductor form a forward circuit.

19. The AC-DC power converter of claim 15, wherein the rear-stage power circuit comprises:
   a) a first transformer as the second magnetic component, and having a primary winding coupled in series with the power switch; and
   b) a third diode having an anode coupled to a first secondary winding of the first transformer, and a cathode coupled to the load, wherein the power switch, the first transformer, and the third diode form a flyback circuit.

20. The AC-DC power converter of claim 19, wherein the front-stage power circuit comprises:
   a) a second transformer as the first magnetic component, and sharing the primary winding of the first transformer;
   b) a fourth diode having an anode coupled to one terminal of a secondary winding of the second transformer;
   c) a fifth diode having a cathode coupled to a cathode of the fourth diode;
   d) a second inductor having one terminal coupled to the cathode of the fifth diode; and
   e) a second diode having an node coupled to the other terminal of the second inductor, and a cathode coupled to the positive electrode of the energy storage capacitor, wherein the power switch, the second transformer, the fourth diode, the fifth diode, and the second inductor form a forward circuit.

* * * * *